United States Patent
Blouin et al.

[11] 3,968,690
[45] July 13, 1976

[54] COMBINED INFANT PACIFIER AND THERMOMETER

[76] Inventors: Michel Blouin, 2815 des Pruches St., Orsainville, Quebec; Léo Mercier, 1778 Bergemont St., Quebec, Quebec, both of Canada

[22] Filed: Feb. 12, 1975

[21] Appl. No.: 549,224

[52] U.S. Cl. .................. 73/343 R; 73/362.8; 73/374
[51] Int. Cl.² .................. G01K 1/14; G01K 5/02
[58] Field of Search ........ 73/343 R, 343 B, 362.8, 73/374

[56] References Cited
UNITED STATES PATENTS

| | | | |
|---|---|---|---|
| 2,463,510 | 3/1949 | Brasefield | 73/374 |
| 2,651,202 | 9/1953 | Burns | 73/374 X |
| 3,117,450 | 1/1964 | Hoy | 73/374 |
| 3,913,402 | 10/1975 | Doyle | 73/343 R |

FOREIGN PATENTS OR APPLICATIONS 227,569  1/1925  United Kingdom............ 73/343 R

*Primary Examiner*—James J. Gill
*Assistant Examiner*—Frederick Shoon

[57] ABSTRACT

A mouth thermometer combined with a pacifier in the form of a nipple to take the temperature of a young child or baby in the mouth thereof, instead of in the rectum, as commonly done so far, while averting the drawbacks inherent to the use of the conventional thermometer for so doing. The combination thermometer including a mercury thermometer tube defining a mercury bulb portion and a temperature display portion, a shield surrounding the bulb portion, a flexible nipple mouth-piece surrounding the shield and the bulb portion therein, and a stop ring integrally formed with the nipple mouth-piece and retained at the junction of the thermometer tube portions by an annular bulge of the shield.

4 Claims, 3 Drawing Figures

COMBINED INFANT PACIFIER AND THERMOMETER

This invention relates to a medical thermometer and, more particularly, to a mouth thermometer.

Medical thermometers are currently made of a straight tube and the temperature of a child is currently taken in the rectum. It is not found practical to take the temperature in the mouth of a young child or baby, since, apparently, the latter has difficulty to satisfactorily keep the straight tube thermometer in his mouth. The insertion of the thermometer in the rectum has not proved entirely safe, since, occasionally, the thermometer is broken by impulsive movements of the child. Also, the thermometer has to be held by an adult to prevent ejection from the rectum.

It is a general object of the present invention to provide a medical thermometer particularly adapted to take the temperature of a young child or baby.

It is another general object of the present invention to provide a medical thermometer of familiar and appealing form for a young child to induce more receptivity on his part.

It is a more specific object of the present invention to provide a mouth thermometer embodied into a nipple form to resolve the above-mentioned difficulties encountered so far in taking the temperature of a young child or baby.

The above and other objects and advantages of the present invention will be better understood in the light of the following detailed description of a preferred embodiment thereof which is illustrated, by way of example, in the accompanying drawings, wherein.

Figure 1:
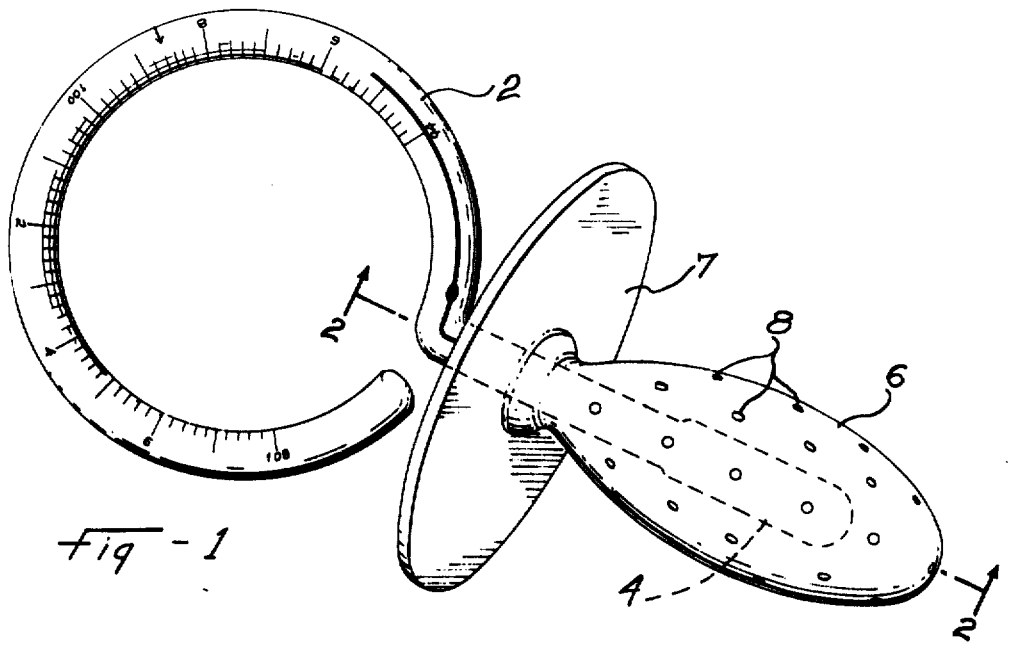
FIG. 1 is a perspective view of a nipple and mouth thermometer device according to the present invention.

The illustrated nipple and mouth thermometer device comprises a thermometer tube including a mercury bulb portion 1 at one end thereof and a temperature display portion 2 at the other end thereof. The bulb portion 1 and the temperature display portion 2 are joined into end-to-end adjoining relationship in communication with each other, such that the mercury 3 in the bulb portion expands into the tube portion 2. The latter is graduated along the length thereof, as shown in FIG. 1, to display the temperature of a patient. The thermometer tube portion 2 is curved to form a handle.

A shield 4, of preferably rigid material, such as metal or hard rubber or plastic, is engaged over the bulb portion 1 to surround the latter. The open end of the shield 4 forms an exterior annular flange or bulge 5, which is fixedly positioned at the junction between the tube portions 1 and 2. A nipple mouth-piece 6 is engaged over the bulb portion 1 and the shield 4 to surround the latter in spaced-apart relationship therewith.

A stop ring 7 is integrally formed with the nipple mouth-piece 6 and engages the axially opposite sides of the annular flange 5 to be held by the latter in fixed position at the above-mentioned junction of the tube portions 1 and 2.

Apertures 8 are provided through, preferably, both the shield 4 and the nipple mouth-piece 6 to allow better heat transfer from the mouth to the bulb portion 1.

The temperature of a young child or baby may thus be taken by merely inserting the nipple mouth-piece 6 into the mouth of the patient in the same manner as an ordinary nipple.

Figure 2:
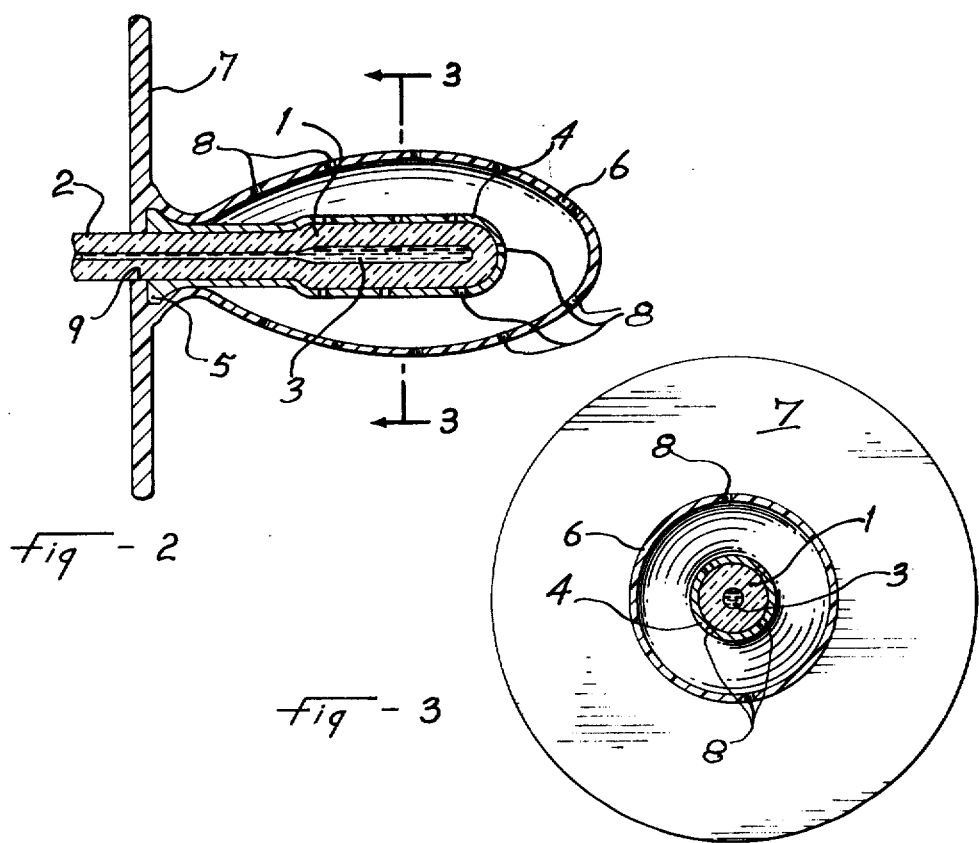
FIG. 2 is a longitudinal cross-sectional view as seen along line 2—2 in FIG. 1.
Figure 3:
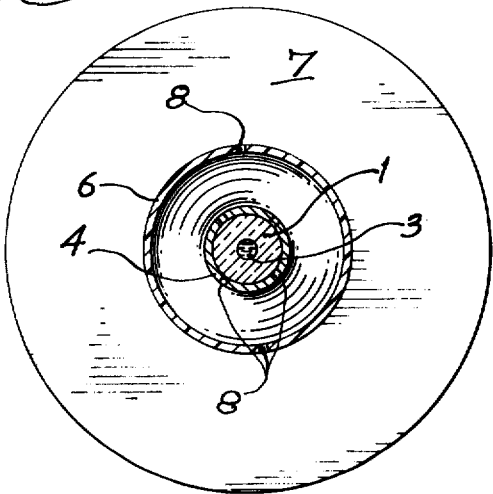
FIG. 3 is a transverse cross-sectional view as seen along line 3—3 in FIG. 2.

The integrally formed stop ring 7 and nipple mouth-piece 6 may be bodily removed for cleaning and replacement whenever required. This is done by bending the stop ring toward the outer end of the nipple mouth-piece, around the annular flange 5 until the inner edge 9 of the stop ring 7 passes over the annular flange 5, such as toward the right in FIG. 2.

It must be noted that the free end of the bulb portion 1 may be extended such as to reach the inner end of the nipple mouth-piece 6 and even project into an aperture aligned therewith, such as to come into more direct contact with the tongue of the child.

Mercury has been mentioned as the liquid in the thermometer, but, obviously, other suitable liquid may be used, such as colored iodine.

What we claim is:

1. A combined pacifier and mouth thermometer device comprising a liquid thermometer tube including a liquid bulb portion having an inner open end and an outer closed end, a temperature display portion joined to the inner open end of the liquid bulb portion along said thermometer tube, a flexible nipple mouth-piece freely surrounding the outer end of said liquid bulb portion and having apertures therethrough placing the bulb portion in open commumication with the exterior of the mouth-piece, and a stop ring secured over said tube at the junction between said bulb and said temperature display portions.

2. A combined pacifier and mouth thermometer device as defined in claim 1, further including a shield surrounding said liquid bulb portion inwardly of said flexible nipple mouth-piece and also having apertures therethrough placing the bulb portion in open communication with the exterior of the mouth-piece in cooperation with the apertures of the mouth-piece.

3. A combined pacifier and mouth thermometer device as defined in claim 2, wherein said stop ring and said flexible nipple mouth-piece are integrally formed of rubber-like material, said shield is made of flexible material and includes a closed end fully covering the liquid bulb portion, and opposite open end forming at said junction an outwardly bulging portion projecting into said integrally formed nipple mouth-piece and stop ring and restraining the same longitudinally of said thermometer tube.

4. A combined pacifier and mouth thermometer device as defined in claim 3, wherein said temperature display portion is annularly curved and forms a handle on the opposite side of said stop ring relative to said nipple mouth-piece.

* * * * *